March 7, 1967 W. A. ADAIR 3,307,465
LIGHT-PRINTING APPARATUS
Filed June 1, 1964

Inventor
William A. Adair
by W. Bartlett Jones,
Attorney

United States Patent Office 3,307,465
Patented Mar. 7, 1967

3,307,465
LIGHT-PRINTING APPARATUS
William A. Adair, Houston, Tex., assignor to The Frederick Post Co., Chicago, Ill., a corporation of Illinois
Filed June 1, 1964, Ser. No. 371,682
5 Claims. (Cl. 95—77.5)

The present invention relates to exposure of light-sensitive layers to actinic light, as represented by the printing of light-sensitive diazotype paper.

It is well known to provide a rotary glass exposure cylinder within which is a tubular source of actinic light, such as a lamp generating ultra-violet light. Over the cylinder is usually run in contact therewith a lamination of two sheets, one being a transparency with a pattern to obstruct the light, and the other being a sheet with a light-sensitive layer. The tubular lamp has its ends approximately at the ends of the exposure cylinder. At the center of the length dimension light is received from the entire length of the lamp. At the ends of the exposure cylinder less light is received than at the center, for lack of light emission from the regions beyond the ends of the lamp. Hence, there is what is called fall-off of light toward the ends of the exposure cylinder.

Such an exposure cylinder is heated by radiation from the light-source as an incident to providing the light. Heat alone without the actinic light is not effective. It is primarily the actinic light which functions, but it is known that the activity is a result of a combination of light and heat, the heat enhancing the action of the light. When the rotary exposure cylinder has different temperatures along its length, the total activity is more intense at the hotter portions for uniform light intensity, resulting in visual irregularities in the printed layer. Because of the incidental heat in exposure cylinders it has been a practice to provide cooling means to lessen the effect from heat. Such means, however, in general, has not been effective to produce a uniform temperature, for example, from end to end of a rotary cylinder. The mechanical structure at the ends of the exposure cylinder conducts heat away from the ends and results in a lower temperature. Thus, the actinic effect at the ends of the cylinder is lessened by a combination of lower temperature and fall-off of light. The usual way to lessen the effect of heat is to effect the passage of ventilating air through the cylinder.

The present invention aims to minimize the effect of fall-off and of different temperatures at different regions of a body transmitting radiation including actinic light and heat to a light-sensitive layer in close proximity to it.

It is a particular object to control the total activity at the exterior of a rotary cylinder containing an elongated source of actinic light, and particularly so, when said cylinder is irregularly cooled by ventilating air.

Although the invention in its broadest aspect may be applied to stationary as well as rotary exposure surfaces, it is hereinbelow described and explained in principle and in detail by reference to commercial types of apparatus.

Figure 1:
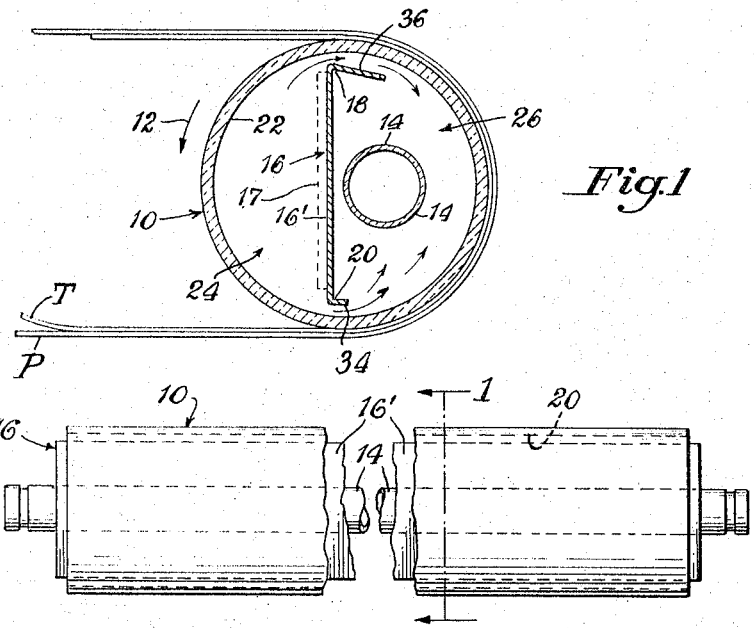
FIG. 1 is an enlarged cross-section on the line 1—1 of FIG. 2 showing the exposure cylinder in use.
Figure 2:
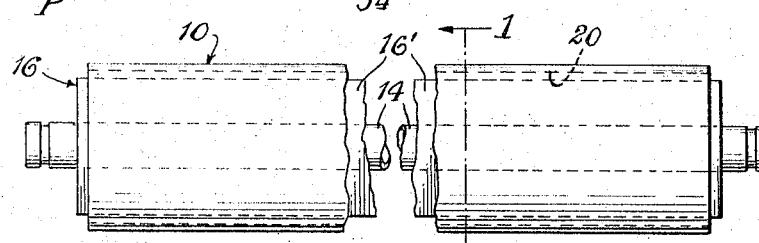
FIG. 2 represents vertical elevation of the exposure cylinder of FIG. 1 looking toward the left side of FIG. 1.
Figure 3:
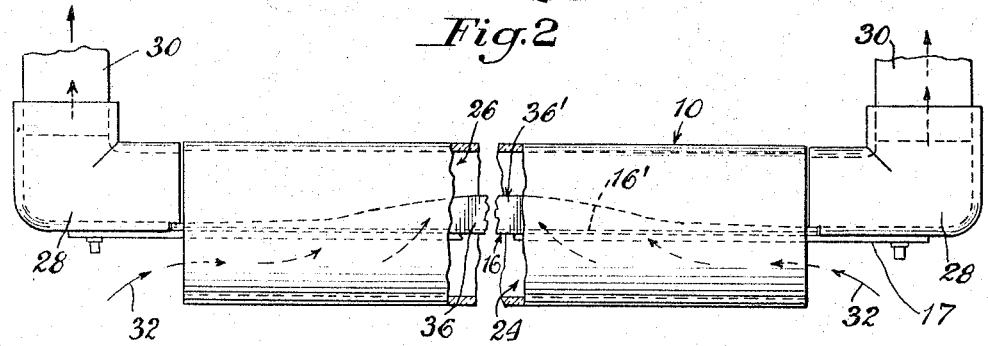
FIG. 3 represents a top view of the exposure cylinder and diagrammatic illustrations of ventilating means therefor.

In FIG. 1, a hollow glass rotary cylinder 10, driven by means not shown, rotates in the direction of arrow 12. It contains a stationary tubular ultraviolet lamp 14 near the center, but to one side thereof, located so that it is surrounded by air space. Alongside the lamp is a stationary reflecting shield 16 in part to increase the intensity of light directed to the right of FIG. 1, and in part to form a partition dividing the interior into two chambers. Preferably, the partition is diametrically located. The shield 16 is carried by a rigid plate 17 (FIG. 3) to which it is secured by means (not shown) through holes 17' (FIG. 4) in the shield. In FIG. 1, the plate 17 is indicated by dotted lines. As shown, the longitudinal edges 18 and 20 of the partitioning panel 16' of the shield 16 are spaced from the interior 22 of the cylinder 10 to provide air passages from chamber 24 to the lamp chamber 26.

The foregoing partitioning structure is well-known in combination with means to draw air from both ends of the lamp chamber 26, and into it from chamber 24, the ends of chamber 24 being exposed to admit atmospheric air. The ends of lamp chamber 26 open into fixed capping boxes or the like designated 28, having a suitably closed bearing relation with the rotating cylinder 10, to which boxes suction tubes 30 are connected. As a result air indicated by arrows 32 enters the ends of chamber 24 and passes over the partition edges 18 and 22 into chamber 26. The entering air cools the ends of the cylinder to a lower temperature than the air which passes on to the central portion of the length of cylinder 10. As a result of fall-off, the activity at the ends is further lowered by the cooler environment.

Figure 4:
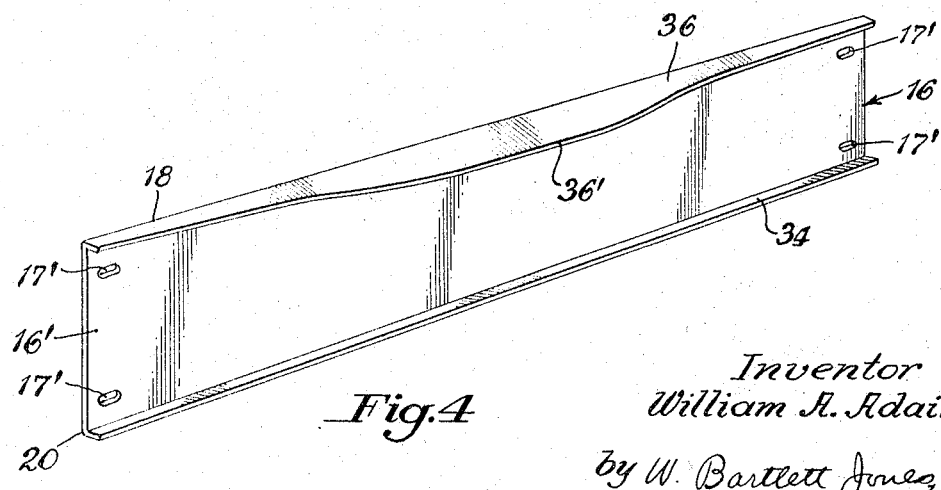
FIG. 4 is a perspective view of an improved partition embodying the present invention.

FIG. 4 shows the shield 16 with its partitioning panel 16' having the edges 18 and 20. The shield 16 is usually polished reflecting metal maintained in said planar panel form by flanges at its edges. Numeral 34 represents a conventional rigidifying angular flange at the edge 20. At the edge 18 heretofore, it has been customary to provide a second rigidifying flange of uniform width. Thus, it has uniformly obstructed radiation to the interior 22 of cylinder 10.

According to the present invention a flange or lip 36 of varying width projects from edge 18 into chamber 26 in spaced relation to the interior 22 of cylinder 10, so as to permit air from chamber 24 to pass over it. The width of the lip 36 is greater at the center where the temperature of the cylinder 10 is higher and where the light intensity from the lamp is greater, as shown at 36'.

In FIG. 1 there is shown a lamination of two sheets passing over the cylinder 10 and held in contact therewith by conventional means, not shown. Letter T indicates a patterned transparency such as a drawing on a tracing sheet, and letter P represents a light-sensitive sheet to be printed, such as diazotype paper. Since the heat is in part effective in combination with light to act upon the sheet P, its effect with the prior art uniform flange or lip is greater at the longitudinal center of cylinder 10, where the light is more intense than at the cooler ends. To compensate for the excess of light and of heat at the center, a portion of the light at this region is obstructed by the wider portion 36' of lip 36, and less obstructed as the width narrows toward the cooler ends. The exact contour of the variable width strip or of other light-obstructing means is controlled by the specific details of the apparatus which produce and effect the variable temperature of the cylinder 10, or of any other exposure surface, whether rotary or stationary.

The apparatus to embody the invention of the method will vary according to particular design, the one described being merely illustrative of the invention expressed in the appended claims.

I claim:

1. In combination, a hollow rotary light-printing cylinder, a fixedly positioned elongated heat-producing source of actinic light within said cylinder surrounded by air space, means operable to effect cooler end portions of the cylinder and progressively hotter portions away from said ends, and a fixedly positioned light-obstructing means between said light source and the interior of the cylinder, which means has more obstructing area at the intermediate portions of the cylinder and progressively less obstructing area toward said ends.

2. In combination, a hollow rotary light-printing cylinder, a fixedly positioned elongated heat-producing source of actinic light within said cylinder surrounded by air space, ventilating means for the interior of the cylinder effecting different temperatures at different longitudinal portions of the exterior of the cylinder, and fixedly positioned light-obstructing means between said light source and the interior of the cylinder, said means having portions of different light-obstructing areas varying locally in the same direction as the temperatures vary at said different longitudinal portions.

3. In a light-printing apparatus having in combination, a hollow rotary light-printing cylinder, an elongated heat-producing tubular source of actinic light non-rotatably mounted within said cylinder and surrounded by air space, a light-reflecting shield alongside said tubular source located as a fixed partition dividing the interior of the cylinder into two longitudinal chambers and providing at the inner periphery of the cylinder air passages between the chambers extending along the length of the partition and over the longitudinal edges of the partition, and suction means at each end of the chamber containing said source for drawing air from said chamber and into said chamber from the other chamber over the edges of the partition, said other chamber being open at its ends and exposed to draw in atmospheric air for cooling the exposure cylinder, the improvement comprising an elongated light-obstructing strip between the light source and the interior of the cylinder and in spaced relation from the interior of the cylinder for the passage of air over it, which strip is widest at the middle portion and progressively narrower toward the ends, whereby to emit to the cylinder from the light source more radiation at the ends than at the middle portion.

4. In a light-printing apparatus having in combination, a hollow rotary exposure cylinder, an elongated heat-producing tubular source of actinic light non-rotatably mounted within said cylinder and surrounded by air space, a light-reflecting shield alongside said tubular source located as a fixed partition dividing the interior of the cylinder into two longitudinal chambers and providing at the inner periphery of the cylinder air passages between the chambers extending along the length of the partition and over the longitudinal edges of the partition, and suction means at each end of the chamber containing said light source for drawing air from said chamber and into said chamber from the other chamber over the edges of the partition, said other chamber being open at its ends and exposed to draw in atmospheric air for cooling the exposure cylinder, the improvement in which said reflecting shield has a light-obstructing lip projecting from one edge of the partition, which lip is spaced from the inner periphery of the cylinder for the passage of air over it, and which lip is widest at the middle portion and progressively narrower toward the ends, whereby to emit to the cylinder from the light source more radiation at the ends than at the middle portion.

5. In combination, a light-printing body for exposure to a light-sensitive layer, an elongated tubular heat-producing source of actinic light positioned to radiate actinic light and heat to said body, means operable to render the end regions of said body cooler than the region intermediate said ends, and light-obstructing means between said source and said body which means has more obstructing area at said intermediate region of said body than at cooler end regions of said body in amount tending to equalize the actinic activity over the useful area of said body.

References Cited by the Examiner
UNITED STATES PATENTS

| | | | |
|---|---|---|---|
| 2,351,251 | 6/1944 | Davenport | 95—77.5 X |
| 2,431,520 | 11/1947 | Streich | 95—77.5 |
| 3,165,047 | 1/1965 | Hersh | 95—77.5 |

JULIA E. COINER, *Primary Examiner.*